US008536281B2

(12) United States Patent
Montarnal et al.

(10) Patent No.: US 8,536,281 B2
(45) Date of Patent: Sep. 17, 2013

(54) METHOD FOR SYNTHESIZING SUPRAMOLECULAR MATERIALS

(75) Inventors: Damien Montarnal, Paris (FR); Ludwick Leibler, Paris (FR); Francois-Genes Tournilhac, Paris (FR); Manuel Hidalgo, Brignais (FR)

(73) Assignees: Arkema France, Colombes (FR); Centre National de la Recherche Scientifique CNRS, Paris Cedex (FR)

( * ) Notice: Subject to any disclaimer, the term of this patent is extended or adjusted under 35 U.S.C. 154(b) by 128 days.

(21) Appl. No.: 12/991,181

(22) PCT Filed: May 5, 2009

(86) PCT No.: PCT/FR2009/050825
§ 371 (c)(1),
(2), (4) Date: Nov. 5, 2010

(87) PCT Pub. No.: WO2009/141558
PCT Pub. Date: Nov. 26, 2009

(65) Prior Publication Data
US 2011/0059280 A1 Mar. 10, 2011

(30) Foreign Application Priority Data
May 5, 2008 (FR) ...................... 08 52981

(51) Int. Cl.
C08L 77/00 (2006.01)
C08G 59/44 (2006.01)
C08G 69/34 (2006.01)

(52) U.S. Cl.
USPC ........... 525/424; 525/420; 525/435; 528/335; 528/341

(58) Field of Classification Search
USPC ................. 525/420, 424, 435; 528/335, 341
See application file for complete search history.

(56) References Cited

U.S. PATENT DOCUMENTS

| | | | |
|---|---|---|---|
| 2,992,195 A | 7/1961 | Young et al. | |
| 4,912,196 A | 3/1990 | Leoni | |
| 5,728,799 A | 3/1998 | Oh | |
| 6,008,313 A | 12/1999 | Walker | |
| 2005/0148760 A1* | 7/2005 | Tournilhac et al. | ........... 528/422 |
| 2007/0123694 A1 | 5/2007 | Tournilhac et al. | |
| 2008/0221272 A1 | 9/2008 | Tournilhac et al. | |
| 2009/0062551 A1 | 3/2009 | Tournilhac et al. | |
| 2010/0135940 A1 | 6/2010 | Grimaldi et al. | |

FOREIGN PATENT DOCUMENTS

| | | |
|---|---|---|
| JP | 11 036188 | 2/1999 |
| JP | 2000 169539 | 6/2000 |
| JP | 2006 159636 A | 6/2006 |
| WO | WO 2006/016041 A | 2/2006 |
| WO | WO 2006/087475 A1 | 8/2006 |
| WO | WO 2008/029065 A | 3/2008 |

OTHER PUBLICATIONS

International Search Report PCT/FR2009/050825, Date of completion Mar. 2, 2010, date of mailing Mar. 10, 2010, 3 pages.
French Priority Search Report FR 0852981, Date of Completion Dec. 2, 2008, 2 pages.
Nippon P M C KK, "Resin for coating paper and composition for coating paper," Publication Date: Feb. 9, 1999; English Abstract of JP-11 036188.
Sumitomo Chem Co Ltd., "Production of thermosetting resin aqueous solution," Publication Date: Jun. 20, 2000; English Abstract of JP-2000 169539.

\* cited by examiner

*Primary Examiner* — Ana Woodward
(74) *Attorney, Agent, or Firm* — Millen, White, Zelano & Branigan, P.C.

(57) ABSTRACT

The present invention relates to a method for synthesizing a supramolecular material comprising: 1—the reaction of at least one carboxylic diacid, or ester or chloride of such a diacid, with, on the one hand, at least one modifier compound bearing both reactive functional groups capable of reacting with the carboxylic acid, ester or acid chloride functional groups and associative groups capable of associating with one another by hydrogen bonds, in a molar ratio of the reactive functional groups to the carboxylic acid, ester or acid chloride functional groups of between 0.10 and 0.50, and, on the other hand, at least one polyamine, said reactions being carried out successively or simultaneously, and 2—the reaction of the polyamide obtained at the end of step 1 with urea. The present invention also relates to the resulting material, and also to the uses thereof.

11 Claims, No Drawings

METHOD FOR SYNTHESIZING SUPRAMOLECULAR MATERIALS

The present invention relates to a novel method for synthesizing supramolecular materials, and also to the resulting materials and to the uses thereof.

"Supramolecular" materials are materials constituted of compounds linked together by noncovalent bonds, such as hydrogen, ionic and/or hydrophobic bonds. One advantage of these materials is that these physical bonds are reversible, in particular under the influence of temperature or through the action of a selective solvent. It is thus possible to envision using them in fields of application such as coatings (paints, cosmetics, etc.), adhesives, hot-melt adhesives and powder paints, or as an additive in thermoplastics or in asphalts.

Some of them also possess elastomeric properties. In contrast to the conventional elastomers, these materials have the advantage of being able to become fluid above a certain temperature, which facilitates the use thereof, in particular good mold filling, and also the recycling thereof. Although they are not constituted of crosslinked polymers but of small molecules, these materials are, like the elastomers, capable of displaying dimensional stability for very long periods and of recovering their initial shape after considerable deformation. They can be used for manufacturing leaktight seals, thermal insulating materials, sound-proofing materials, tires, cables, sheaths, soles of footwear, packaging, patches (cosmetic or dermopharmaceutical patches), dressings, flexible hose clips, vacuum tubes, or alternatively tubes and flexible hoses for conveying fluids.

Supramolecular materials have already been described by the applicant.

Thus, document WO 03/059964 describes a supramolecular material obtained:
either by reacting urea with polyamines (in particular diethyltriamine, DETA, triethylenetetraamine, TETA, or tetraethylenepentamine, TEPA) containing more than two primary or secondary amine functions, so as to form compounds bearing associative groups (for example imidazolidone functions) and capable of subsequently reacting with an alkyl halide or a polyacid,
or by reacting urea with a polyamide, itself obtained by reacting a polyamine (in particular DETA or TETA) with a polyacid, such as dimers and trimers of fatty acids or polyacrylic acid.

This material does not display elastomeric properties.

A self-healing elastomeric supramolecular material is, moreover, disclosed in document WO 2006/087475. It comprises molecules containing at least three associative functional groups, such as imidazolidone groups, capable of forming several physical bonds and which can be obtained by reacting urea with the product of the reaction of a polyamine with triacids. It is indicated that this product can, as a variation, be obtained by reacting triacids with the product of condensation of urea with a polyamine such as diethyltriamine (DETA).

The materials obtained according to the teachings of documents WO 03/059964 and WO 2006/087475 contain triacids which are covalently linked, by amide functions, to intermediate junctions and/or to endings, constituted of the product of reacting polyamine with urea and which therefore contain many associative groups, i.e. containing N—H and C═O functions capable of associating with one another via hydrogen bonds. Specifically, the publication by P. Cordier et al., Nature, 451, 977 (2008) mentions that an elastomer synthesized according to the procedure described in document WO 2006/087475 comprises amidoethylimidazolidone endings and di(amidoethyl)urea and diamidotetraethyl triurea junctions. It is understood that, owing to the method for synthesizing these materials, the chemical natures of the abovementioned junctions and endings are interdependent, in the sense that it is impossible to vary the nature of the amidoethylimidazolidone ending without effecting that of the two junctions.

However, it would be desirable to be able to vary not only the number, but also the nature of the abovementioned endings and junctions in such a way as to obtain a wider range of mechanical properties for these materials.

In addition, the above methods, the first step of which consists in reacting a polyamine with a polyacid, use, in order to control the degree of polymerization of the resulting polyamide, an excess of amine that it would be advisable to eliminate at the end of this first step by carrying out several washes. Other washes are also necessary in order to eliminate the excess urea used in the second step of the method, and also the ammonia given off during the reaction of the urea with the polyamide and the imidazolidones formed by secondary reaction of the urea with the residual polyamine. It is understood that these washes have a negative effect on the cost of the method, which is undesirable.

It would therefore be useful to have a novel method for synthesizing supramolecular materials, including self-healing elastomeric materials, which does not have the drawbacks of the prior art.

Now, as a result of numerous research studies, the applicants, to their credit, developed a method which makes it possible to be free of the drawbacks of the known methods, and in particular the washing steps and the use of solvents. Moreover, the method according to the invention does not require having recourse to particularly pure reactants. It is therefore easier and less expensive to implement than the prior art methods.

This method also makes it possible to readily adjust the architecture of the resulting materials and, consequently, their properties, by modifying the amount and the nature of the reactants used. It is thus in particular possible to obtain a material having the properties of a thermoplastic elastomer, or even of a self-healing thermoplastic elastomer, i.e. an elastomer capable, once cut, torn or scratched, of repairing itself simply by bringing the fractured surfaces back into contact without the need for heating or for the application of a substantial pressure or for carrying out any chemical reaction, the material thus repaired still having elastomeric properties.

More specifically, the subject of the present invention is a method for synthesizing a supramolecular material, comprising:

1—reacting at least one dicarboxylic acid, or an ester or chloride of such a diacid, with, on the one hand, at least one modifier compound bearing both reactive functions capable of reacting with the carboxylic acid, ester or acid chloride functions, and associative groups capable of associating with one another via hydrogen bonds, in a molar ratio of the reactive functions for the carboxylic acid, ester or acid chloride functions of between 0.10 and 0.50, and, on the other hand, at least one polyamine, said reactions being carried out successively or simultaneously, and 2—reacting the polyamide obtained at the end of step 1 with urea.

The subject of the invention is also the material which can be obtained according to this method.

By way of preamble, it will be noted that the expression "between" should be interpreted, in the present description, as including the limits cited.

The reactants used in the method according to the invention will now be described in greater detail.

Dicarboxylic Acid

The dicarboxylic acid used in the first step of the method according to the invention advantageously comprises from 5 to 100, preferably from 12 to 100, and more preferably from 24 to 90 carbon atoms. It may be a linear alkyldicarboxylic acid, such as glutaric acid, adipic acid, pimelic acid, suberic acid, azelaic acid, sebacic acid, undecanedioic acid, dodecanedioic acid, brassylic acid, tetradecanedioic acid, pentadecanedioic acid, thapsic acid or octadecanedioic acid, or a branched alkyldicarboxylic acid, for instance 3,3-dimethylglutaric acid.

The diacid may, moreover, be mixed with other compounds, such as monocarboxylic or tricarboxylic acids. A mixture of fatty acid monomers, dimers and trimers may thus be used.

According to the invention, dimers (oligomers of two identical or different monomers) and mixtures of dimers and trimers of fatty acids of plant origin are preferably used. These compounds result from the oligomerization of unsaturated fatty acids such as undecylenic acid, myristoleic acid, palmitoleic acid, oleic acid, linoleic acid, linolenic acid, ricinoleic acid, eicosenoic acid and docosenoic acid, which are usually found in pine oil (tall oil fatty acids), rapeseed oil, corn oil, sunflower oil, soya oil, grapeseed oil, linseed oil and jojoba oil, and also eicosapentaenoic acid and docosahexaenoic acid, which are found in fish oils.

Use may thus be made of a mixture of oligomers of fatty acids containing dimers, trimers and monomers of linear or cyclic $C_{18}$ fatty acids, said mixture being predominantly made up of dimers and trimers and containing a low percentage (usually less than 5%) of monomers. Preferably, said mixture comprises:

0.1% to 40% by weight, preferably 0.1% to 5% by weight, of monomers of fatty acids which may be identical or different, 0.1% to 99% by weight, preferably 18% to 85% by weight, of dimers of fatty acids which may be identical or different, and 0.1% to 90% by weight, preferably 5% to 85% by weight, of trimers of fatty acids which may be identical or different.

As examples of fatty acid dimer/trimer mixtures, mention may be made of (% by weight):

Pripol® 1017 from Uniqema, mixture of 75%-80% of dimers and of 18%-22% of trimers with about 1%-3% of monomer fatty acids, Pripol® 1013 from Uniqema, mixture of 95%-98% of dimers and of 2%-4% of trimers with a maximum of 0.2% of monomer fatty acids, Pripol® 1006 from Uniqema, mixture of 92%-98% of dimers and of a maximum of 4% of trimers with a maximum of 0.4% of monomer fatty acids, Unidyme® 40 from Arizona Chemicals, mixture of 65% of dimers and of 35% of trimers with less than 1% of monomer fatty acids, Unidyme® 14 from Arizona Chemicals, mixture of 94% of dimers and of less than 5% of trimers and other higher oligomers with about 1% of monomer fatty acids, Empol® 1008 from Cognis, mixture of 92% of dimers and of 3% of higher oligomers, essentially trimers, with about 5% of monomer fatty acids, Empol® 1016 from Cognis, mixture of 80% of dimers, 4% of monomers and 16% of trimers of fatty acids, Empol® 1018 from Cognis, mixture of 81% of dimers and of 14% of higher oligomers, including essentially trimers, with about 5% of monomer fatty acids.

The Pripol®, Unidyme®, Empol® and Radiacid® products comprise monomers of $C_{18}$ fatty acids and oligomers of fatty acids corresponding to multiples of $C_{18}$.

According to one particular embodiment of the invention, the dicarboxylic acid can be partially or totally replaced with a derivative of a diacid or diacids, this diacid derivative being chosen from an acid ester and an acid chloride.

By way of example of an ester, mention may be made of a methyl, ethyl or isopropyl ester of a fatty acid as defined above.

A preferred fatty acid ester is a fatty acid methyl ester, in particular a methyl ester of a fatty acid dimer or of a mixture of fatty acid oligomers as defined above.

By way of example of a fatty acid chloride, mention may be made of sebacoyl chloride.

Modifier Compound

In the first step of the method according to the invention, the dicarboxylic acid or the acid chloride or ester derivative is reacted with a modifier compound bearing both associative groups and reactive functions capable of reacting with the carboxylic acid, ester or acid chloride functions of the dicarboxylic acid or of the derivative used, in a molar ratio of the reactive functions to the carboxylic acid (respectively, ester or acid chloride) functions of between 0.10 and 0.50, preferably between 0.10 and 0.30.

The term "associative groups" is intended to mean groups capable of associating with one another via hydrogen bonds, advantageously via 1 to 6 hydrogen bonds. Examples of associative groups that can be used in the invention are imidazolidonyl, triazolyl, triazinyl, bis-ureyl and ureido-pyrimidyl groups. The imidazolidonyl group is preferred.

With regard to the reactive functions, they can in particular be chosen from primary or secondary amine functions or alcohol functions. According to the invention, the modifier compound preferably bears at least one primary amine function.

The modifier compound can thus correspond to any one of formulae (B1) to (B5):

(B1)

(B2)

(B3)

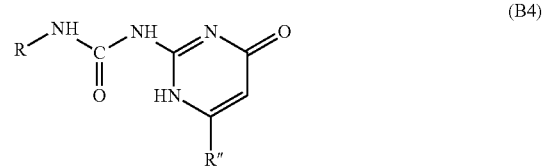

(B4)

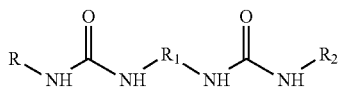

(B5)

where:
R denotes a unit containing at least one reactive function,
R' denotes a hydrogen atom,
R", $R_1$ and $R_2$ denote any group,
A denotes an oxygen or a sulfur atom or an —NH group, preferably an oxygen atom.

Preferred examples of modifier compounds are 2-aminoethylimidazolidone (UDETA), 1-(2-[(2-aminoethyl)amino]-ethyl)imidazolidone (UTETA), 1-[(2-{2-[(2-aminoethyl)-amino]ethyl}amino)ethyl]imidazolidone (UTEPA), N-(6-aminohexyl)-N'-(6-methyl-4-oxo-1,4-dihydropyrimidin-2-yl)urea (UPy), 3-amino-1,2,4-triazole and 4-amino-1,2,4-triazole. UDETA is preferred for use in the present invention.

These compounds can be obtained by reacting urea with a polyamine. For example, UDETA, UTETA and UTEPA can respectively be prepared by reacting urea with diethylenetriamine (DETA), triethylenetetramine (TETA) and tetraethylenepentamine (TEPA).

The reaction of the modifier compound with the dicarboxylic acid can, for example, be carried out at a temperature of between 20 and 200° C., preferably between 130 and 170° C., for a period ranging from 1 to 15 h, for example from 3 to 9 h, advantageously with stirring and under an inert atmosphere.
Polyamine The dicarboxylic acid, or acid chloride or ester derivative thereof, is also reacted, in the first step of the method according to the invention, with at least one polyamine, for example in a molar ratio of amine functions to acid functions of the dicarboxylic acid of between 0.90 and 0.50, in particular between 0.90 and 0.70.

The polyamine may be any compound bearing at least two amine functions, preferably primary amine functions, and preferably a compound of formula (I):

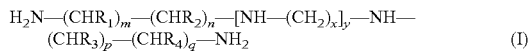

in which:
$R_1$, $R_2$, $R_3$ and $R_4$ independently denote a hydrogen atom or a $C_1$-$C_6$ alkyl group such as a methyl group,
m, n, p and q independently denote an integer ranging from 1 to 3,
x denotes an integer ranging from 1 to 6,
y denotes an integer ranging from 0 to 2.

In formula (I) above, at least one, and preferably all, of the conditions below are met:
  $R_1$, $R_2$, $R_3$ and $R_4$ denote a hydrogen atom,
  m+n is equal to 2, 3 or 6, preferably to 2,
  p+q is equal to 2, 3 or 6, preferably to 2,
  x denotes an integer ranging from 2 to 4,
  y is equal to 0 or 1, preferably to 0.

Preferred examples of polyamines of formula (I) are DETA (diethylenetriamine), TETA (triethylenetetramine), TEPA (tetraethylenepentamine) and dihexylenetriamine.

As a variant, the polyamine according to the invention may be a linear alkylenediamine containing 3 to 20 carbon atoms, such as cadaverine, putrescine, hexamethylenediamine or 1,12-diaminododecane, or a cyclic alkylenediamine such as isophoronediamine.

The reaction of the polyamine with the dicarboxylic acid or the acid chloride or ester derivative used can, for example, be carried out at a temperature of between 20 and 200° C.,
preferably between 140 and 180° C., for a period ranging from 1 to 24, h, for example from 6 to 8 h, advantageously with stirring and under an inert atmosphere.

The first step of the method according to the invention comprises reacting the dicarboxylic acid, or the acid chloride or ester derivative thereof, both with the modifier compound and with the polyamine that were described above. These two reactions can be carried out simultaneously or successively. In the case where these reactions are carried out successively, the reaction with the modifier compound will preferably be carried out first, but the reverse order is also possible. They can also be carried out either in separate reactors, or in the same reactor, without it being necessary to provide for a washing or purification step after the first of these reactions.

The polycondensate obtained at the end of the first step may be semicrystalline with a melting point (Mp) most commonly between 30 and 150° C., and it has a glass transition temperature ($T_g$) most commonly between −50° C. and 20° C.

The product resulting from this first step is then reacted, in a second step, with urea, without it being necessary to perform prior washing or purification of said product. The reaction can, for example, be carried out at a temperature of from 130 to 170° C., preferably from 130 to 160° C., with a temperature ramp being performed, for a period ranging from 30 minutes to 8 h, preferably for a period of from 1 to 6 hours, under an inert atmosphere and, advantageously, with stirring. Here again, this reaction can be carried out in a reactor separate from that or those used in the first step, or in the same reactor. It is therefore understood that all the steps of the method according to the invention can be carried out in the same reactor, by successive addition of the reactants, thereby making the method particularly simple and economical.

In this step, the function of the urea is to create additional associative groups, for example according to the following reaction schemes:

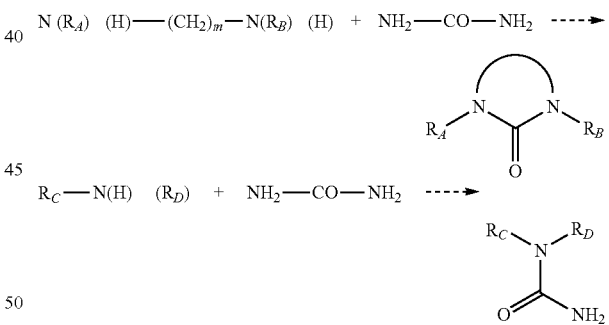

The reactants (dicarboxylic acid or derivative, modifier compound, polyamine and urea) described above can be introduced, in the method according to the invention, in the molten state, in the pulverulent state, or with the use of a solvent, for example in an aqueous solution. However, they are preferably introduced in the pulverulent state or in the molten state, so as to avoid recourse to solvents that need to be subsequently eliminated.

The nature and the proportions of these reactants determine the mechanical characteristics of the material obtained according to the invention.

This material is constituted of an assembly of molecules of different lengths, containing an alcohol-soluble part and, optionally, an insoluble part, i.e. a fraction representing from 0.1% to 90% of the weight of the material and which is not soluble in any solvent. The number-average molecular mass of the soluble fraction is preferably between 300 and 300 000 g/mol as measured by GC.

According to one embodiment of the invention, the average number of associative groups per molecule is at least 1.2, preferably at least 2, or even at least 2.2.

It is understood that this material comprises molecules containing linking bridges, preferably amide linking bridges, formed in the first step of the method for synthesizing said material, by reaction of the reactive groups (advantageously primary amine groups) of the modifier compound with a part of the dicarboxylic acid and by reaction of the amine functions of the polyamine with another part (preferably the rest) of the dicarboxylic acid. This material also contains hydrogen bonds between the associative groups borne by the molecules of which said material is constituted, and which are provided by the modifier compound and by the reaction of the urea with the polyamine. The presence of these reversible hydrogen bonds, which can be broken by an increase in temperature and which can reform at ambient temperature, enables the material according to the invention to have a low viscosity in the molten state, facilitating its use, and, optionally, a high elongation at break at ambient temperature, without, however, it having a high molecular mass.

Moreover, this material preferably also contains inter-molecular hydrophobic bonds, advantageously due to interactions between pendant alkyl groups provided by the dicarboxylic acid. Such groups are in particular present in the fatty acid dimers.

This material advantageously has properties of a thermoplastic elastomer, i.e. the property of being able to be subjected to a uniaxial deformation at ambient temperature, optionally of at least 20% for 15 minutes, and of recovering, once this stress has been removed, its initial dimension, with a remanent deformation of less than 5% of its initial dimension, and which can be formed and reformed at high temperature.

It can, moreover, be capable of self-healing after cutting and having, after the edges of the cut have been brought back into contact, elastomeric properties which allow it to undergo, for example, a tensile deformation of at least 100%, or even of at least 200%, before break, and to recover its initial dimensions once the stress has been removed, with a remanent deformation of less than 10% of its initial dimension.

At the end of the method according to the invention, a material in the form of a soft solid is generally obtained, which can be extruded or milled cold, for example in a hammer mill, bead mill, ball mill, grinding wheel mill or knife mill, and then washed, for example with water, and finally formed, in particular by hot-pressing, calendering, thermo-forming or any other method.

The material according to the invention can in particular be used for manufacturing leaktight seals, thermal insulating materials, sound-proofing materials, tires, cables, sheaths, soles for footwear, packaging, coatings (paints, films, cosmetic products), patches (cosmetic or dermopharmaceutical patches), or other systems for trapping and releasing active agents, dressings, flexible hose clips, vacuum tubes, tubes and flexible hoses for conveying fluids, and, in general, articles which have to display good resistance to tearing and/or to fatigue, rheological additives, additives for asphalt or additives for hot-melt adhesives and adhesives. The subject of the invention is therefore also the use of the material according to the invention for the abovementioned purposes.

In these applications, the material according to the invention can be used as it is or in single-phase or multi-phase mixtures, with one or more compounds such as petroleum fractions, solvents, inorganic and organic fillers, plasticizers, tackifying resins, antioxidants, pigments and/or dyes, for example, in emulsions, suspensions or solutions.

As a variant, this material can be used for producing a cosmetic composition which normally comprises a physiologically acceptable medium, i.e. which is compatible with keratin materials, containing, for example, at least one oil and/or water and/or an alcohol.

This cosmetic composition can be used for caring for and/or making up the skin and/or the skin appendages (such as the eyelashes and the nails) and/or the lips, or else for washing, conditioning and/or shaping the hair.

The invention will be understood more clearly in the light of the following examples, given for illustration purposes only and which are not intended to restrict the scope of the invention, defined by the attached claims.

EXAMPLES

Example 1

Preparation of a Material According to the Invention

First Step:

Substep a: 76 g of Empol® 1016 (acid number 194, degree of monomer (4%), dimer (80%), trimer (16%)) and 6.7 g of purified UDETA (52 mmol), i.e. a [HN$_2$]/[COOH] ratio of 0.2, are introduced into a reactor having a diameter of 60 mm and a nominal volume of 500 ml, fitted with a bottom valve, a device for regulating temperature by means of a heat-transfer fluid, a mechanical stirrer, a dropping funnel, a Dean-Stark apparatus and a gas inlet, preheated to 40° C. The temperature of the bath is brought to 150° C. for 8 hours under a stream of nitrogen of 500 ml/minute and stirring at 280 rpm. During this step, infrared spectroscopy shows a decrease in the $\delta_{NH2}$ signal (1505 cm$^{-1}$), an increase in the $\nu_{c=o}$ signal (1648 cm$^{-1}$), and the release of water vapor. It is decided to stop the reaction when there is no longer any release of water vapor (8 hours in the present example).

After this substep, the reaction product is stored at 50° C. in the reactor.

Substep b: The same assembly and the same conditions (nitrogen, stirring) as above are used. 10.7 g (104 mmol) of diethylenetriamine (purity 98%) are placed in the dropping funnel.

The body of the reactor is heated to 160° C. and the amine is added slowly, dropwise intermittently, over a total period of 3 h. The reaction is left to continue for a further 4 h at 160° C. During this second step, the same type of change as previously is observed by infrared spectroscopy. The end of the release of water vapor, which is here again observed, is used as criterion for stopping the reaction.

After this step, the product is collected via the bottom valve (86 g are collected) and stored at ambient temperature. It is in the form of a viscoelastic liquid which is strongly adhesive on many substrates, in particular on glass, on metal and on paper. The glass transition temperature measured by DSC (differential scanning calorimetry) is −11° C. Rheological measurements carried out in parallel plates geometry with an applied deformation of 1% gave, at the stress frequency of 1 rad/s, the following results:

| | T (° C.) | | | | |
|---|---|---|---|---|---|
| | 25 | 35 | 50 | 70 | 90 |
| G' (Pa) | 33078 | 9812 | 1884 | 234 | 34 |
| G" (Pa) | 49311 | 17568 | 4695 | 947 | 225 |

Second Step:

67 g of the previous product and 6.1 g of urea are introduced into a large reactor (diameter 100 nm) having a nominal volume of 500 ml, fitted with a device for regulating temperature by means of a heat-transfer fluid, a mechanical stirrer and a gas inlet, preheated to 80° C. The stirring is adjusted to 50 rpm and the temperature is brought to 135° C. After half an hour at this temperature, and throughout the rest of the process, a sizable release of ammonia is observed by means of pH indicator paper. Throughout this step, the monitoring of the reaction by infrared spectroscopy reveals a decrease in the urea signal $v_{c=0}$ 1675 cm$^{-1}$.

The temperature is maintained at 135° C. for a total of two hours, then at 140° C. for one hour, and then at 145° C. for one hour. At this stage, it is noted that the reaction mixture that was initially cloudy tends toward becoming transparent. One gram of water is added and the solution becomes cloudy again. The mixture is brought to 150° C. for approximately 1 further hour, during which time a decrease in the release of ammonia is noted.

The criterion for stopping the reaction is this time the fact that the product sets and attaches to the axis of the stirrer. As soon as this is the case, the product is recovered on the stirrer rod.

Forming:

The pieces obtained are placed in a plastic bag and ground cold with a hammer. The fragments, which are 1 to 2 mm in size, are washed by immersion in water for 72 h. In the water, the fragments subjected to the washing have a tendency to stick to one another. The sample, drained beforehand, is cut up again into pieces approximately 5 mm in size, which are placed in a mold consisting of a brass plate 1.6 mm thick pierced with a rectangular hole, placed between two sheets of non-stick paper. After a first pressing at 120° C. for 10 minutes (pressure applied 10 MPa), the film obtained displays irregularities of thickness which are corrected by adding material and repressing until a satisfactory appearance is obtained.

Example 2

Tensile Test

A rectangular sample having dimensions of 3×1.2×60 mm is cut in two down the middle, left to stand for five minutes, repaired by bringing the surfaces of the break into contact again, and then again left to stand for two hours.

A tensile test is carried out on the healed strip after having drawn two marks 4 cm apart on either side of the scar. The strip is stretched until 350% of deformation is reached without break.

The strip is then left to stand at ambient temperature. After 40 minutes, it is noted that it has returned to its initial dimensions.

This example shows that the method according to the invention makes it possible to obtain, under simple and economical conditions, materials having the property of rubber elasticity and capable of self-repairing in the event of them being cut.

The invention claimed is:

1. A method for synthesizing a supramolecular material, comprising:
    1—reacting at least one dicarboxylic acid, or ester or chloride of such a diacid, with (a) at least one modifier compound bearing both reactive functions capable of reacting with the carboxylic acid, ester or acid chloride functions, and associative groups capable of associating with one another via hydrogen bonds, in a molar ratio of the reactive functions to the carboxylic acid, ester or acid chloride functions of between 0.10 and 0.50, that is 2-aminoethylimidazolidone (UDETA) and (b) at least one polyamine that is a linear alkylenediamine having 3 to 20 carbon atoms, TETA (triethylenetetramine), TEPA (tetraethylenepentamine), dihexylenetriamine, or a cyclic alkylenediamine, said reactions (a) and (b) being carried out successively or simultaneously, and
    2—reacting the polyamide obtained at the end of 1 with urea.

2. The method as claimed in claim 1, wherein the dicarboxylic acid comprises from 5 to 100 carbon atoms.

3. The method as claimed in claim 1, wherein the dicarboxylic acid is a dimer of a fatty acid of plant origin.

4. The method as claimed in claim 3, wherein the dicarboxylic acid is a dimer of at least one of the following acids: undecylenic acid, myristoleic acid, palmitoleic acid, oleic acid, linoleic acid, linolenic acid, ricinoleic acid, eicosenoic acid, docosenoic acid, eicosapentaenoic acid or docosahexaenoic acid.

5. The method as claimed in claim 1, wherein the dicarboxylic acid is a linear alkyldicarboxylic acid or a branched alkyldicarboxylic acid.

6. The method as claimed in claim 1, comprising reacting a methyl ester of said dicarboxylic acid.

7. The method as claimed in claim 1, wherein the molar ratio of the reactive functions to the carboxylic acid, ester or acid chloride functions is between 0.10 and 0.30.

8. The method as claimed in claim 1, wherein the polyamine is TETA (triethylenetetramine), TEPA (tetraethylenepentamine), dihexylenetriamine, cadaverine, putrescine, hexamethylenediamine, 1,12-diaminododecane, or a cyclic alkylenediamine.

9. A material obtained according to the method as claimed in claim 1.

10. An item selected from the group consisting of leaktight seals, thermal insulating materials, sound-proofing materials, tires, cables, sheaths, soles for footwear, packaging, coatings, patches, dressings, flexible hose clips, vacuum tubes, pipes and flexible hoses for conveying fluids, rheological additives, additives for asphalt and additives for hot-melt adhesives and adhesives, which item is made from the material according to claim 9.

11. The method as claimed in claim 1, wherein the dicarboxylic acid is glutaric acid, adipic acid, pimelic acid, suberic acid, azelaic acid, sebacic acid, undecanedioic acid, dodecanedioic acid, brassylic acid, tetradecanedioic acid, pentadecanedioic acid, thapsic acid, octadecanedioic acid, or 3,3-dimethylglutaric acid.

* * * * *